US006734217B1

(12) United States Patent
Herrmann et al.

(10) Patent No.: US 6,734,217 B1
(45) Date of Patent: May 11, 2004

(54) FLAME RESISTANT HR COLD-MOULDED FOAM WITH A REDUCED FUME DENSITY AND TOXICITY

(75) Inventors: Marc Herrmann, Leichlingen (DE); Peter Seifert, Lohmar (DE); Franz-Josef Bohne, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 71 days.

(21) Appl. No.: 10/129,766

(22) PCT Filed: Oct. 31, 2000

(86) PCT No.: PCT/EP00/10766

§ 371 (c)(1),
(2), (4) Date: May 8, 2002

(87) PCT Pub. No.: WO01/36509

PCT Pub. Date: May 25, 2001

(30) Foreign Application Priority Data

Nov. 12, 1999 (DE) .......................................... 199 54 739

(51) Int. Cl.⁷ .............................................. C08G 18/64
(52) U.S. Cl. ...................................... 521/137; 521/159
(58) Field of Search ................................. 521/137, 159

(56) References Cited

U.S. PATENT DOCUMENTS

| 3,178,490 A | 4/1965 | Petrino et al. ................. 264/41 |
| 3,182,104 A | 5/1965 | Cwik ........................... 264/45 |
| 4,042,537 A | * 8/1977 | Dahm et al. |
| 4,248,930 A | 2/1981 | Haas et al. .................. 428/315 |
| 4,263,408 A | 4/1981 | Meyborg et al. ............... 521/51 |
| 5,741,827 A | 4/1998 | Chakrabarti et al. ......... 521/121 |
| 5,885,479 A | 3/1999 | Chakrabarti et al. ... 252/182.24 |
| 6,034,146 A | 3/2000 | Falke et al. .................. 521/128 |
| 6,059,990 A | 5/2000 | Falke et al. ............. 252/182.24 |
| 6,103,140 A | 8/2000 | Falke et al. ............. 252/182.26 |

FOREIGN PATENT DOCUMENTS

| DE | 197 07 577 | 8/1998 |
| DE | 198 53 025 | 5/2000 |
| EP | 8 59 019 | 8/1998 |

OTHER PUBLICATIONS

**Journal of Cellular Plastics, Bd. 29, Nr. 1, Feb. 1993, pp. 43–56 XP000345190, Lancaster.
Polyurethanes World Congress 1991—Sep. 24–26, 1991, The Ignition Behaviour of Conventional and HR Foams, Particularly to Relation in Small Ignition Sources by P. F. Haas & F. H. Prager.
Kunststoff–Handbuch, Band VII, Polyurethane Herstellung, Eigenschaften, Verarbeitung und Anwendung by Prof. Dr. Ing. E. h. Dr. Richard Viewey and Dr. August Höchtlen, (month unavailable) 1966, pp. 121–205.

* cited by examiner

*Primary Examiner*—Rachel Gorr
(74) *Attorney, Agent, or Firm*—Joseph C. Gil; John E. Mrozinski, Jr.; Jennifer R. Seng

(57) ABSTRACT

The invention relates to flame-resistant high resilience cold-cure moulded foams, processes for the production thereof and use thereof.

9 Claims, No Drawings

FLAME RESISTANT HR COLD-MOULDED FOAM WITH A REDUCED FUME DENSITY AND TOXICITY

FIELD OF THE INVENTION

The invention relates to flame-resistant high resilience cold-cure moulded foams with reduced smoke intensity and toxicity, processes for their production and use thereof

BACKGROUND OF THE INVENTION

Cold-curing polyurethane flexible moulded foams are used, inter alia, as seats, seat backs or headrests in motor vehicles, rail vehicles and water craft, aircraft and in the furniture sector. In all the above-stated sectors, the flame resistance of the foams is significant. In rail vehicles, aircraft and furniture in particular, flame resistance requirements are very high. In order to meet the appropriate standards, such as for example BS 5852, Part 2, Crib Ignition Source V, CSE RF4/83 or UIC 564/2 or DIN 54341, ASTM E 162, California TB 133, melamine is added to the foam as a flame retardant. A disadvantage of this is that it involves stirring a solid into the polyol formulation, with the attendant dust development. Furthermore, the solid melamine settles out of the polyol formulation, which makes processing difficult. Melamine sedimentation may be prevented by using special stabilised melamine dispersions in polyethers, as described in DE-OS 195 40 809 and EP-A 835 905. Moreover, the incorporation of melamine into the polymer matrix of the foam has a negative effect on the mechanical properties of the foams, in particular their tensile strength, elongation at break and tear propagation resistance. High smoke density and toxicity levels on combustion constitute a further disadvantage.

It is clear from "Polyurethanes World Congress 1991", Technomic Publishing, Basel, Lancaster 1991, p. 615 ff. that flame-resistant high resilience slabstock foams may be obtained by combining pure toluene diisocyanate with a PHD polyol and liquid phosphorus/halogen compounds. However, a high resilience cold-cure moulded foam made from these components does not fulfil the requirements set by BS 5852, Part 2, Crib V, a fact which may possibly be explained by the differences in polymer synthesis in slabstock foam and moulded foam. Results obtained for slabstock foam cannot thus be applied to moulded foam.

It has now been found that high resilience cold-cure moulded foams with reduced flammability, smoke density and toxicity and improved mechanical properties may be obtained by reacting modified TDI with PHD or PIPA polymer polyols.

SUMMARY OF THE INVENTION

The object of the invention is therefore a high resilience cold-cure moulded foam which may be obtained by reacting
a) modified TDI with
b) dispersions of relatively high-molecular weight polymer-containing hydroxyl compounds, which have been produced by reacting mono- and/or polyisocyanates with polyamines and/or hydrazines and/or hydrazides and/or alkanolamines comprising primary and/or secondary amino groups in a polyether comprising 1 to 8 primary and/or secondary hydroxyl groups and having a number average molecular weight of 400 to 16000,
c) in the presence of chemical and/or physical blowing agents (in particular water), and optionally
d) flame retardants which may be liquid and/or soluble in a) or b) and/or
e) compounds having at least two hydrogen atoms capable of reacting with isocyanates and a molecular weight of 32 to 399, and/or
f) further auxiliary substances.

DETAILED DESCRIPTION OF THE INVENTION

According to the invention, modified toluene diisocyanate (TDI) is used as component a). The isomer ratio of 2,4-TDI to 2.6-TDI may be from 100:0 to 65:35. According to the invention, the TDI is modified in a manner known to the person skilled in the art, as described in G. Oertel (Ed.): "*Kunststoff-Handbuch*", Vol. VII, Carl Hanser Verlag, $3^{rd}$ edition, Munich 1993, pp. 91–97, i.e. it is for example allophanatised, biuretised, trimerised, carbodiimidised or prepolymerised with polyethers or some of component b). Commercially available biuretised toluene diisocyanate types may be used to produce the high resilience cold-cure moulded foams according to the invention, for example the High-Performance TDI types made by Bayer AG.

According to the invention, the polyol component b) contains dispersions of relatively high-molecular weight polymer-containing hydroxyl compounds, which have been produced by reacting mono- and/or polyisocyanates with polyamines and/or hydrazines and/or hydrazides and/or alkanolamines comprising primary and/or secondary amino groups in a polyether comprising 1 to 8 primary and/or secondary hydroxyl groups and having a number average molecular weight of 400 to 16000 ("base polyol"). Base polyols with a number average molecular weight of 1500 to 8000 are preferably used. Hydroxyl compounds are preferably used which have been produced by reacting base polyols with hydrazines (PHD polyols). Component b) preferably has an average OH functionality of 2.0 to 3.5. Polyether polyols are preferably used which have a content of primary OH groups of at least 60 mol %, preferably at least 70 mol %. In another preferred embodiment, the component preferably contains, in addition to a base polyol with an ethylene oxide content of at most 40 wt. %, at least one further polyether polyol with an average functionality of 2 to 6, a number average molecular weight of 1500 to 12000 in an amount of 1 to 50 wt. %, relative to the total amount of component b), and an EO content greater than 40 wt. %. This embodiment results in better skinning and an increased proportion of open cells and allows greater latitude in the adjustment of the NCO/OH index and thus better processability of the formulation. A foam is obtained which exhibits higher elasticity and whose hardness, which may be high owing to the polymer dispersion, is reduced to such an extent that it is possible even to produce flexible mouldings.

Chemical and/or physical blowing agents c) are used to produce the foams according to the invention. Water, which produces a blowing gas in the form of carbon dioxide by reacting with isocyanate groups, is preferably used as a chemical blowing agent constituting component c). Water is preferably used in an amount of 2–8 wt. %, particularly preferably 2 to 4 wt. %, relative to the amount of component b). However, it is also possible to add carbon dioxide to the polyol or isocyanate component in gaseous or liquid form continuously or by the batch process by processes known per se. Non-combustible physical blowing agents such as for example dichloromethane, dichloromonofluoromethane, difluoromethane, trifluoromethane, difluoroethane, 1,1,1,2-tetrafluoroethane, tetrafluoroethane (R 134 or R 134a), 1,1, 1,3,3,3-hexafluoropropane (R 356), 1,1,1,3,3-pentafluoropropane (R 245fa), chlorodifluoroethane, 1,1-dichloro-2,2,2,-trifluoroethane, 2,2-dichloro-2-fluoroethane, heptafluoropropane and sulfur hexafluoride may also be used in component c). Since the blowing agent escapes virtually completely from the foam during the production process, it is also possible to use low-boiling hydrocarbons, e.g. pentane, hexane and isomers thereof. Further suitable blowing agents are carboxylic acids such as formic acid, acetic acid, oxalic acid and chemical blowing agents which release gases in the course of the foaming process, such as carbamates for example. Mixtures of these blowing agents may also be used. These blowing agents are preferably used in combination with water.

Flame retardants d) which are liquid and/or soluble in one of components a) or b) or in both are optionally used in the production of the foams according to the invention. Commercially available phosphorus-containing flame retardants are preferably used, for example tricresyl phosphate, tris(2-chloroethyl) phosphate, tris(2-chloropropyl) phosphate, tris (2,3-dibromopropyl) phosphate, tris(1,3-dichloropropyl) phosphate, tetrakis(2-chloroethyl)ethylene diphosphate, dimethylmethane phosphonate, diethylethane phosphonate, diethanolaminomethylphosphonic acid diethyl ester. Halogen- and/or phosphorus-containing, flame-retarding polyols or mixtures of the flame retardants mentioned are also suitable. The flame retardants are preferably used in an amount of at most 35 wt. %, preferably at most 20 wt. %, relative to component b).

Compounds e) having at least two hydrogen atoms capable of reacting with isocyanates and a molecular weight of 32 to 399 are optionally also used in the production of the foams according to the invention. These are understood to be compounds comprising hydroxyl groups and/or amino groups and/or thiol groups and/or carboxyl groups, preferably compounds comprising hydroxyl groups and/or amino groups, which serve as chain extenders or cross-linking agents. These compounds generally comprise 2 to 8, preferably 2 to 4, hydrogen atoms capable of reacting with isocyanates. Examples thereof are described in DE-OS 28 32 253, pp. 10–20. In a preferred embodiment, mixtures of at least two of these chain extenders and/or cross-linking agents are used. Preferred chain extenders and/or cross-linking agents are, for example, glycerol, triisopropanolamine, ethylene glycol, diethanolamine and triethanolamine.

Further auxiliary substances and additives f) may also optionally be used in the production of the high resilience cold-cure moulded foams according to the invention. These comprise, for example, catalysts which accelerate the reaction between the isocyanate component a) and the polyol component b). Examples of suitable catalysts are organotin compounds such as tin(II) salts of organic carboxylic acids, e.g. tin(II) acetate, tin(II) octoate, tin(II) ethylhexoate and tin(II) laurate, and dialkyltin(IV) salts, for example dibutyltin diacetate, dibutyltin dilaurate and dioctyltin diacetate. Further examples of suitable catalysts are amines such as dimethylaminopropylurea, dimethylaminopropylamine, bis(dimetylaminopropyl)amine, diazabicyclooctane, dimethylethanolamine, triethylamine, dimethylcyclohexylamine, dimethylbenzylamine, pentamethyldiethylenetriamine, N,N,N',N'-tetramethylbutanediamine, N-methylmorpholine, bis(dimethylaminoethyl)ether and tris(dialkylaminoalkyl)-s-hexahydrotriazine. The catalyst component preferably contains at least one aliphatic amine. A combination of several catalysts may also be used. By way of example, it is also possible to use paraffins or fatty alcohols or dimethylpolysiloxanes as well as pigments or dyes and, furthermore, stabilisers acting against the effects of ageing and weathering, plasticisers such as dioctyl phthalate and fungistatically and bacteriostatically acting substances. These are generally added to the polyol component in amounts of from 0 to 10 parts by weight, preferably 0 to 5 parts by weight. Further examples of surface active additives and foam stabilisers, cell regulators, reaction retarders, stabilisers, flame-retarding substances and dyes and fungistatically and bacteriostatically active substances which may optionally also be used, together with details about the mode of use and action of these additives are described in G. Oertel (Ed.): "*Kunststoff-Handbuch*", Vol. VII, Carl Hanser Verlag, 3$^{rd}$ edition, Munich 1993, pp. 110–115 and DE-OS 27 32 292.

The reaction components are conventionally caused to react by the single-stage process known per se, the prepolymer process or the semi-prepolymer process, wherein mechanical equipment is often used, e.g. as described in U.S. Pat. No. 2,764,565. Details about processing equipment which may also be used according to the invention are described in R. Vieweg, A. Höchtlen (Eds.): "*Kunststoff-Handbuch*", Vol. VII, Carl-Hanser-Verlag, Munich 1966, pp. 121–205. According to the invention, foaming is preferably performed in closed moulds, the reaction mixture being introduced into a mould. Suitable mould materials are metal, e.g. aluminium, or plastics, e.g. epoxy resin. In the mould, the foamable reaction mixture foams and forms the moulding. According to the invention, it is possible, in this context, to proceed in such a way that a sufficient quantity of foamable reaction mixture is introduced into the mould for the foam formed to fill the mould exactly. However, it is also possible for more foamable reaction mixture to be introduced into the mould than is necessary for filling the inside of the mould with foam. In the latter case, the "over-charging" method is used; such a procedure is known for example from U.S. Pat. Nos. 3,178,490 and 3,182,104.

Production of the foams according to the invention is preferably performed in such a way that the NCO/OH index, i.e. the stoichiometric ratio between reactive isocyanate groups and hydroxyl groups multiplied by 100, is between 65 and 120. The NCO/OH index is particularly preferably 70 to 110. The bulk density of the resulting mouldings preferably amounts to from 30 to 120 kg/m$^3$. In a preferred embodiment of the invention, the ratio of the components is selected so that the filler content of the foam formulation, i.e. the proportion of the dispersed polymer component contained in component b) relative to the total amount of the foam formulation, amounts to from 3 to 30 wt. %, preferably 4 to 16 wt. %.

The invention also provides the use of the foams according to the invention as upholstery material for seats, seat backs, armrests and headrests, for example, in motor vehicles, aircraft and water craft and in furniture for private and public use.

EXAMPLES

The following abbreviations are used below:

Polyol A: polyether triol, OH number 28, EO content approx. 13.5 wt. %, filled with 20 wt. % polyurea dispersion (Desmophen® 7619 manufactured by Bayer AG)

Polyol B: polyether triol, OH number 28, EO content approx. 13.5 wt. %, filled with 20 wt. % styrene/acrylonitrile polymer (Bayfit® 3699 manufactured by Bayer AG)

Polyol C: polyether polyol PIPA, for production see below

Polyol D: polyether triol, OH number 28, EO content approx. 13.5 wt. %

Polyol E: polyether diol, OH number 28, EO content approx. 13.5 wt. %

Polyol F: polyether triol OH number 37, EO content approx. 85 wt. %

Polyol G: polyether diol, OH number 56, EO content approx. 50 wt. %

Isocyanate 1: modified TDI (biuret) with an NCO content of 42 wt. %

Isocyanate 2: modified TDI (biuret) with an NCO content of 37 wt. %

Isocyanate 3: modified TDI (allophanate) with an NCO content of 40.7 wt. %

Isocyanate 4: modified TDI (prepolymerised with polyol D), NCO content 42 wt. %

Isocyanate 5: TDI with 80% of the 2,4-isomer (Desmodur® T80 manufactured by Bayer AG)

L 3200: Niax® Silicone L 3200, foam stabiliser

L 3100: Niax® Silicone L 3100, foam stabiliser

L 3002: Niax® Silicone L 3002, foam stabiliser

A1: Niax® Catalyst A1, bis(dimethylaminoethyl)ether, 70%, in dipropylene glycol

DMAPA: dimethylaminopropylamine

33 LV: Dabco® 33 LV, diazabicyclooctane 33%, in dipropylene glycol

TCPP: tris(2-chloropropylphospate) (Levagard® PP manufactured by Bayer AG)

Production of Polyol C 90 parts by weight of a polyether triol (OH number 35, EO content approx. 13.5 wt. %) were mixed intensively at room temperature with 5 parts by weight of triethanolamine. 5 parts by weight of TDI 80 were then added to the mixture with homogenisation. The initially clear mixture became turbid due to precipitation of the finely divided polymer dispersion. After 12 hours of heat treatment at 50° C. and subsequent cooling to room temperature, the polymer dispersion could be further processed. The OH number was approximately 57 and the filler content approximately 10 wt. %.

Production of the Foams:

The ratios indicated in the Tables relate to parts by weight of the corresponding components. The polyol formulation was produced by mixing the corresponding parts by weight of the individual components and was mixed intensively with the corresponding parts by weight of the isocyanate (Examples 1 to 26) or processed using a high-pressure installation. The reaction mixture was introduced into an aluminium mould preheated to 40° C., the mould was closed with an aluminium lid and the reaction mixture was left to foam. After 5 minutes, the foams were removed from the mould.

Table 1:

The fire to which the foams produced with an SAN-filled polyol or base polyol (Examples 1 and 2 respectively) using a modified TDI were subjected during a flammability test became self-sustaining and had to be extinguished. The foams according to the invention (Examples 3 and 4) passed the test.

Table 2:

The foams produced with the polyol formulation according to the invention and the TDI modified according to the invention passed the flammability test.

Table 3:

The foams according to the invention pass the flammability test. Comparative Example 19 based on pure TDI 80 fails the test.

Table 4:

The foams according to the invention, including EO-rich polyethers, pass the flammability test.

Table 5:

The foams according to the invention pass the flammability test even without further liquid flame retardants (Examples 25–27).

Table 6:

The foam according to the invention (Example 26) provides more favourable smoke density and toxicity values than Comparative Example 34.

TABLE 1

Flammability test to BS 5852, Part 2, Crib Ignition Source V

| | Ex. 1 Comparison | Ex. 2 Comparison | Ex. 3 | Ex. 4 |
|---|---|---|---|---|
| Polyolformulation | | | | |
| Polyol A | | | 87 | |
| Polyol B | 87 | | | |
| Polyol C | | | | 87 |
| Polyol D | | 100 | | |
| Polyol E | 13 | | 13 | 13 |
| TCPP | 20 | 20 | 20 | 20 |
| Water | 3 | 3 | 3.4 | 3 |
| A 1 | 0.05 | 0.05 | 0.05 | 0.05 |
| DMAPA | 0.3 | 0.3 | 0.3 | 0.3 |
| 33 LV | 0.3 | 0.3 | 0.3 | 0.3 |
| L 3200 | 0.7 | 0.7 | 0.7 | |
| L 3100 | | | | 0.7 |
| L 3002 | 0.5 | 0.5 | 0.5 | 0.5 |
| Glycerol | 0.3 | 0.3 | 0.3 | 0.3 |
| Isocyanate 1 | 38.2 | 38.2 | 38.2 | 38.2 |
| Index | 95 | 95 | 85 | 95 |
| FT-bulk density [g/l] | 54 | 53 | 53 | 47 |
| BS 5852, Crib V | fail | fail | pass | pass |
| Weight loss [g] | | | 28 | 27 |

TABLE 2

Flammability test to BS 5852, Part 2, Crib Ignition Source V

| | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|
| Polyol formulation | | | | | | | | | | |
| Polyol A | 40 | 50 | 50 | 50 | 60 | 60 | 60 | 70 | 80 | 87 |
| Polyol D | | | 50 | 50 | 40 | 40 | 40 | 30 | 20 | 13 |
| Polyol E | 60 | 50 | | | | | | | | |
| TCPP | 20 | 20 | 20 | 20 | 20 | 20 | 20 | 20 | 20 | 20 |
| Water | 3.19 | 3.24 | 3.24 | 3.24 | 3.29 | 3.29 | 3.29 | 3.34 | 3.39 | 3.42 |
| A 1 | 0.05 | 0.05 | 0.05 | 0.05 | 0.05 | 0.05 | 0.05 | 0.05 | 0.05 | 0.05 |
| DMAPA | 0.3 | 0.3 | 0.3 | 0.3 | 0.3 | 0.3 | 0.3 | 0.3 | 0.3 | 0.3 |
| 33 LV | 0.3 | 0.3 | 0.3 | 0.3 | 0.3 | 0.3 | 0.3 | 0.3 | 0.3 | 0.3 |
| L 3100 | 0.7 | 0.7 | 0.7 | 0.7 | 0.7 | 0.7 | 0.7 | 0.7 | 0.7 | 0.7 |
| L 3002 | 0.5 | 0.5 | 0.5 | 0.5 | 0.5 | 0.5 | 0.5 | 0.5 | 0.5 | 0.5 |
| Glycerol | 0.3 | 0.3 | 0.3 | 0.3 | 0.3 | 0.3 | 0.3 | 0.3 | 0.3 | 0.3 |
| Isocyanate 1 | 38.2 | 38.2 | 38.2 | | | | 38.2 | 38.2 | 38.2 | 38.2 |
| Isocyanate 3 | | | | | | 39.3 | | | | |
| Isocyanate 2 | | | | 43.4 | | | | | | |
| Isocyanate 4 | | | | | 38.2 | | | | | |
| Index | 90 | 89 | 89 | 89 | 88 | 88 | 88 | 87 | 86 | 85 |
| FT - bulk density [g/l] | 55 | 54 | 54 | 58 | 54 | 52 | 54 | 54 | 54 | 53 |
| BS 5852, Crib V | pass | pass | pass | pass | pass | pass | pass | pass | pass | pass |
| Weight loss [g] | 56 | 40 | 36 | 45 | 34 | 56 | 31 | 34 | 37 | 25 |

TABLE 3

Flammability test to BS 5852, Part 2, Crib Ignition Source V

| | Ex. 15 | Ex. 16 | Ex. 17 | Ex. 18 | Ex. 19 Comparison |
|---|---|---|---|---|---|
| Polyolformulation | | | | | |
| Polyol A | 70 | 70 | 70 | 70 | 70 |
| Polyol E | 30 | 30 | 30 | 30 | 30 |
| TCPP | 20 | 15 | 10 | 5 | 5 |
| Water | 3 | 3 | 3 | 3 | 3 |
| A 1 | 0.05 | 0.05 | 0.05 | 0.05 | 0.05 |
| DMAPA | 0.3 | 0.3 | 0.3 | 0.3 | 0.3 |
| 33 LV | 0.3 | 0.3 | 0.3 | 0.3 | 0.5 |
| L 3100 | 0.7 | 0.7 | 0.7 | 0.7 | 1 |
| L 3002 | 0.5 | 0.5 | 0.5 | 0.5 | 0.5 |
| Glycerol | 0.3 | 0.3 | 0.3 | 0.3 | 1 |
| Isocyanate 1 | 38.2 | 38.2 | 38.2 | 38.2 | |
| Isocyanate 5 | | | | | 35.3 |
| Index | 87 | 87 | 87 | 87 | 87 |
| FT-bulk density [g/l] | 53 | 53 | 53 | 53 | 46 |
| BS 5852, Crib V | pass | pass | pass | pass | fail |
| Weight loss [g] | 26 | 30 | 27 | 35 | |

TABLE 4

Flammability test to BS 5852, Part 2, Crib Ignition Source V

| | Ex. 20 | Ex. 21 | Ex. 22 | Ex. 23 | Ex. 24 |
|---|---|---|---|---|---|
| Polyolformulation | | | | | |
| Polyol A | 70 | 80 | 87 | 80 | 70 |
| Polyol D | 20 | 10 | | | |
| Polyol F | 10 | 10 | | | |
| Polyol G | | | 13 | 20 | 30 |
| TCPP | 20 | 20 | 20 | 20 | 20 |
| Water | 3.34 | 3.39 | 3.42 | 3.39 | 3.34 |
| A 1 | 0.05 | 0.05 | 0.05 | 0.05 | 0.1 |
| DMAPA | 0.3 | 0.3 | 0.3 | 0.3 | 0.3 |
| 33 LV | 0.3 | 0.3 | 0.3 | 0.3 | 0.4 |
| L 3100 | 0.7 | 0.7 | 0.7 | 0.7 | 0.7 |
| L 3002 | 0.5 | 0.5 | 0.5 | 0.5 | 0.5 |
| Glycerol | 0.3 | 0.3 | 0.3 | 0.3 | 0.3 |
| Isocyanate 1 | 38.2 | 38.2 | 40 | 39.1 | 39.6 |
| Index | 87 | 86 | 85 | 86 | 87 |
| FT-bulk density [g/l] | 54 | 54 | 53 | 54 | 53 |
| BS 5852, Crib V | pass | pass | pass | pass | pass |
| Weight loss [g] | 38 | 30 | 32 | 25 | 30 |

TABLE 5

Paper cushion test to DIN 54341 and UIC 564/2

| | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|
| Polyol formulation | | | | | | | | | |
| Polyol A | 100 | 100 | 100 | 100 | 100 | 100 | 100 | 100 | 100 |
| TCPP | 0 | 0 | 0 | 5 | 5 | 5 | 20 | 20 | 20 |

TABLE 5-continued

Paper cushion test to DIN 54341 and UIC 564/2

|  | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|
| Water | 3 | 3 | 3 | 3 | 3 | 3 | 3 | 3 | 3 |
| A 1 | 0.05 | 0.05 | 0.05 | 0.05 | 0.05 | 0.05 | 0.05 | 0.05 | 0.05 |
| DMAPA | 0.3 | 0.3 | 0.3 | 0.3 | 0.3 | 0.3 | 0.3 | 0.3 | 0.3 |
| 33 LV | 0.3 | 0.3 | 0.3 | 0.3 | 0.3 | 0.3 | 0.3 | 0.3 | 0.3 |
| L 3100 | 0.5 | 0.7 | 0.7 | 0.7 | 0.7 | 0.7 | 0.7 | 0.7 | 0.7 |
| L 3002 | 0.5 | 0.5 | 0.5 | 0.5 | 0.5 | 0.5 | 0.5 | 0.5 | 0.5 |
| Glycerol | 0.3 | 0.3 | 0.3 | 0.3 | 0.3 | 0.3 | 0.3 | 0.3 | 0.3 |
| Isocyanate 1 | 34.2 | 38.2 | 42.2 | 34.2 | 38.2 | 42.2 | 34.2 | 38.2 | 42.2 |
| Index | 75 | 83 | 92 | 75 | 83 | 92 | 75 | 83 | 92 |
| FT - bulk density [g/l] | 55 | 55 | 55 | 55 | 55 | 55 | 55 | 55 | 55 |
| DIN 54341 | pass | pass | pass | pass | pass | pass | pass | pass | pass |
| UIC 564/2 | pass | pass | pass | pass | pass | pass | pass | pass | pass |

TABLE 6

Smoke density and toxicity to NF-F 16101

|  | Ex. 26 | Ex. 34 |
|---|---|---|
| Polyolformulation |  |  |
| Polyol A | 100 | 14.05 |
| Polyol D |  | 79.66 |
| Polyol F |  | 1.87 |
| TCPP |  | 2.59 |
| Melamine |  | 33 |
| Water | 3 | 2.78 |
| A 1 | 0.05 | 0.05 |
| DMAPA | 0.3 | 0.37 |
| 33 LV | 0.3 | 0.09 |
| B 4690 |  | 0.47 |
| L 3100 | 0.7 |  |
| L 3002 | 0.5 |  |
| 2-ethylhexanoic acid |  | 0.14 |
| Glycerol | 0.3 | 0.64 |
| Isocyanate 1 | 38.2 | 25.9 |
| Index | 83 | 92 |
| FT-bulk density [g/l] | 55 | 70 |
| Smoke density Dm | 156 | 496 |
| Smoke density VOF$_4$ | 460 | 1338 |
| Smoke I.T.C. | 26.27 | 34.54 |
| Smoke index I.F. | 30.02 | 66.83 |
| Class | F2 | F3 |

What is claimed is:

1. A high resilience cold-cure foam prepared by reacting
   a) a modified TDI with
   b) a dispersion of a high-molecular weight polymer-containing hydroxyl compound, wherein the dispersion is produced by reacting
      (i) a mono- or polyisocyanates with
      (ii) polyamine, hydrazine, hydrazide, alkanolamine or a mixture thereof, wherein the polyamine, hydrazine, hydrazine, alkanolamine or mixture thereof comprise primary or secondary amino groups in
      (iii) a polyether, wherein the polyether comprises 1 to 8 primary or secondary hydroxyl groups and has a number average molecular weight of about 400 to about 16,000,
      (iv) a polyether polyol having a functionality of 2 to 6, a number average molecular weight of 1500 to 12000, in an amount of 1 to 50 wt. %, relative to the total weight of component b), and an EO content greater than 40 wt. %,
   c) in the presence of a blowing agent, and optionally
   d) a flame retardant, wherein the flame retardant is a liquid or is soluble in a) or b), and optionally
   e) a compound having at least two hydrogen atoms capable of reacting with an isocyanate and having a molecular weight of about 32 to about 399, and optionally
   f) auxiliary substances.

2. The foam according to claim 1, wherein the modified TDI is produced by reacting one or more TDI isomers with a portion of component b).

3. The foam according to claim 1, wherein component b) has a functionality of 2.0 to 3.5.

4. The foam according to claim 1, wherein the blowing agent is water, carbon dioxide, dichloromethane, dichloromonofluoromethane, difluoromethane, trifluoromethane, difluoroethane, 1,1,1,2-tetrafluoroethane, tetrafluoroethane, 1,1,1,3,3,3-hexafluoropropane, 1,1,1,3,3-pentafluoropropane, chlorodifluoroethane, 1,1-dichloro-2,2,2,-trifluorethane, 2,2-dichloro-2-fluoroethane, heptafluoropropane, sulfur hexafluoride, pentane, hexane and isomers thereof, formic acid, acetic acid, oxalic acid, carbamates and mixtures thereof.

5. The foam according to claim 1, wherein the flame retardant is tricresyl phosphate, tris(2-chloroethyl) phosphate, tris(2-chloropropyl) phosphate, tris(2,3-dibromopropyl) phosphate, tris(1,3-dichloropropyl) phosphate, tetrakis(2-chloroethyl)ethylene diphosphate, dimethylmethane phosphonate, diethylethane phosphonate, diethanolaminomethylphosphonic acid diethyl ester, halogen or phosphorus-containing flame-retarding polyols, or mixtures thereof.

6. The foam according to claim 1, wherein component e) is glycerol, triisopropanolamine, ethylene glycol, diethanolamine or triethanolamine.

7. The foam according to claim 1, wherein component f) is tin(II) acetate, tin(II) octoate, tin(II) ethylhexoate, tin(II) laurate, dibutyltin diacetate, dibutyltin dilaurate, dioctyltin diacetate, dimethylaminopropylurea, dimethylaminopropylamine, bis(dimethylaminopropyl) amine, diazabicyclooctane, dimethylethanolamine, triethylamine, dimethylcyclohexylamine, dimethylbenzylamine, pentamethyldiethylenetriamine, N,N,N',N'-tetramethylbutanediamine, N-methylmorpholine, bis(dimethylaminoethyl)ether, tris(dialkylaminoalkyl)-s-hexahydrotriazine, a paraffin, a fatty alcohol, a dimethylpolysiloxane, a pigment, a dye, a dioctyl phthalate, a fungistatically or bacteriostatically acting substance or mixtures thereof.

8. An upholstery material comprising high resilience cold-cure foam produced by a process comprising the step of reacting a) a modified TDI with
b) a dispersion of a high-molecular weight polymer-containing hydroxyl compound, wherein the dispersion is produced by reacting
   (i) a mono- or polyisocyanates with
   (ii) polyamine, hydrazine, hydrazide, alkanolamine or a mixture thereof, wherein the polyamine, hydrazine, hydrazide, alkanolamine or mixture thereof comprise primary or secondary amino groups in
   (iii) a polyether, wherein the polyether comprises 1 to 8 primary or secondary hydroxyl groups and has a number average molecular weight of about 400 to about 16,000,
   (iv) a polyether polyol having a functionality of 2 to 6, a number average molecular weight of 1500 to 12000, in an amount of 1 to 50 wt. %, relative to the total weight of component b), and an EO concret grater than 40 wt. %,
c) in the presence of a blowing agent, and optionally
d) a flame retardant, wherein the flame retardant is a liquid or is soluable in a) or b), and optionally
e) a compound having at least two hydrogen atoms capable of reacting with an isocyanate and having a molecular weight of about 32 to about 399, and optionally
f) auxiliary substances.

9. The upholstery material of claim 8, wherein the upholstery material is in the form of a seat, seat back, armrest or headrest.

\* \* \* \* \*